(No Model.)
W. S. PRITZ.
TRACE CARRIER.
No. 360,048. Patented Mar. 29, 1887.
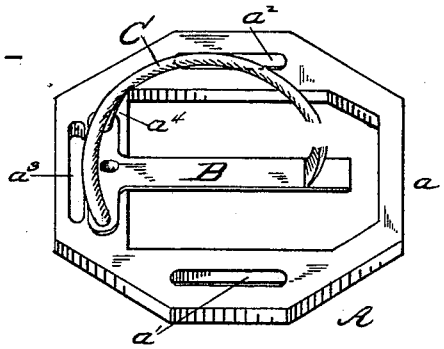
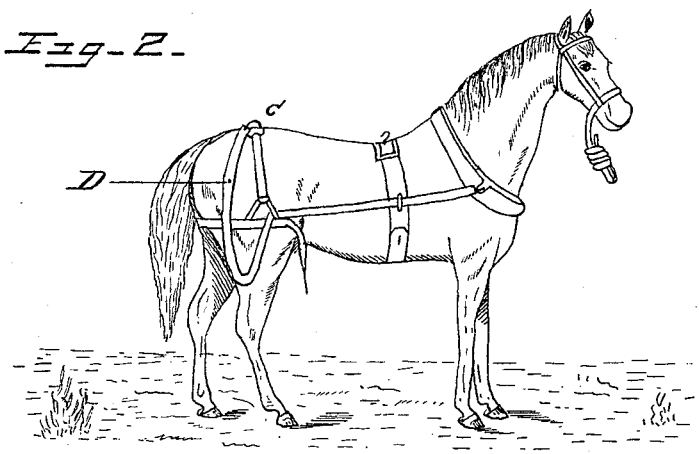
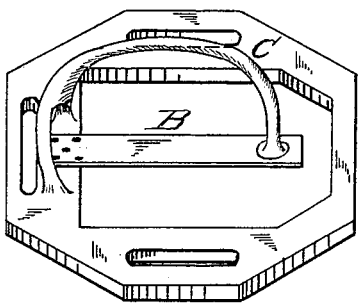
Witnesses
Henry Ferris
Jno. W. Wright
Inventor
Winfield Scott Pritz
By his Attorneys
Whittesey & Wright

UNITED STATES PATENT OFFICE.

WINFIELD SCOTT PRITZ, OF LA JUNTA, COLORADO.

TRACE-CARRIER.

SPECIFICATION forming part of Letters Patent No. 360,048, dated March 29, 1887.

Application filed October 13, 1886. Serial No. 216,147. (No model.)

*To all whom it may concern:*

Be it known that I, WINFIELD SCOTT PRITZ, a citizen of the United States, residing at La Junta, in the county of Bent and State of Colorado, have invented certain new and useful Improvements in Trace-Carriers, of which the following is a full, clear, and exact description.

The object of my invention is to provide means for holding up the ends of the traces when not in use, to prevent them from trailing on the ground or from dangling about the horse's legs, at the risk of annoying or frightening him.

My invention consists in the combinations and arrangements of parts, hereinafter described, and particularly pointed out in the claim.

Referring to the accompanying drawings, Figure 1 is a perspective view of my improved trace-carrier. Fig. 2 shows the manner of its application and use. Fig. 3 shows a modified form of hook.

The base-plate or frame A is formed with a bar, $a$, for the attachment of the back-strap of the harness, and with three slots, $a'$ $a^2$ $a^3$, for the two hip-straps and the crupper-strap, respectively. The center of the base-plate is cut out, as shown, to reduce the weight and to give room for the play of the spring B. This spring is preferably flat and straight, as shown, and it is riveted or otherwise fastened to the cross-bar $a^4$, which is left between the central opening of the base-plate and the slot $a^3$. In this same cross-bar, $a^4$, is fixed one end of a bent rod or hook, C. As shown in the drawings, the extremity of the rod is bifurcated, the ends of the fork being passed through the widened end of the spring B and through the cross-bar $a^4$, and secured by upsetting or clinching against the under side of the cross-bar. The other end of the hook in its normal position lies substantially in the plane of the base-plate A and in contact with the end of the spring B. The advantages of this construction are several. In the first place, the bifurcation of the hook enables it to resist the lateral strains which are brought upon it when the traces are being carried, and it is kept from getting out of line with the spring B. Furthermore, as the end of the hook lies in the plane of the base-plate in contact with the spring, there is little or no danger of the reins catching under the hook.

The operation of the device may be readily understood. When the horse is detached from the carriage or plow, or whatever he may have been harnessed to, the eye in the end of each trace is to be slipped upon the hook C, the spring B yielding to admit the trace, but preventing its accidental removal from the hook, as clearly illustrated in Fig. 2. The traces are thus securely held up out of the dirt, and there is no danger of the horse stepping on them or becoming restive by having them switching about his legs.

Having thus described my invention, what I claim, and desire to secure by Letters Patent, is—

The combination, with the base-plate A, having the bar $a$ and the slots $a'$ $a^2$ $a^3$, of the bifurcated hook C, secured to the base-plate, and the spring B, bearing against the end of the hook, substantially as and for the purpose set forth.

In witness whereof I have hereunto set my hand this 8th day of October, 1886.

WINFIELD SCOTT PRITZ.

Witnesses:
W. J. ANDERSON,
JNO. T. RUSSELL.